June 28, 1955 E. M. BAILEY, JR 2,711,728
BLOOD PRESSURE MEASURING DEVICE
Filed Aug. 24, 1951 2 Sheets-Sheet 1
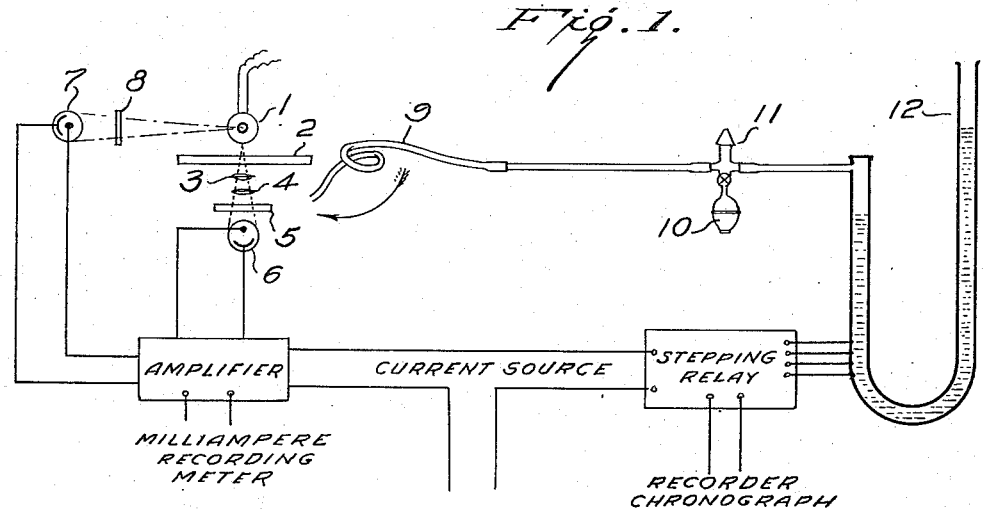
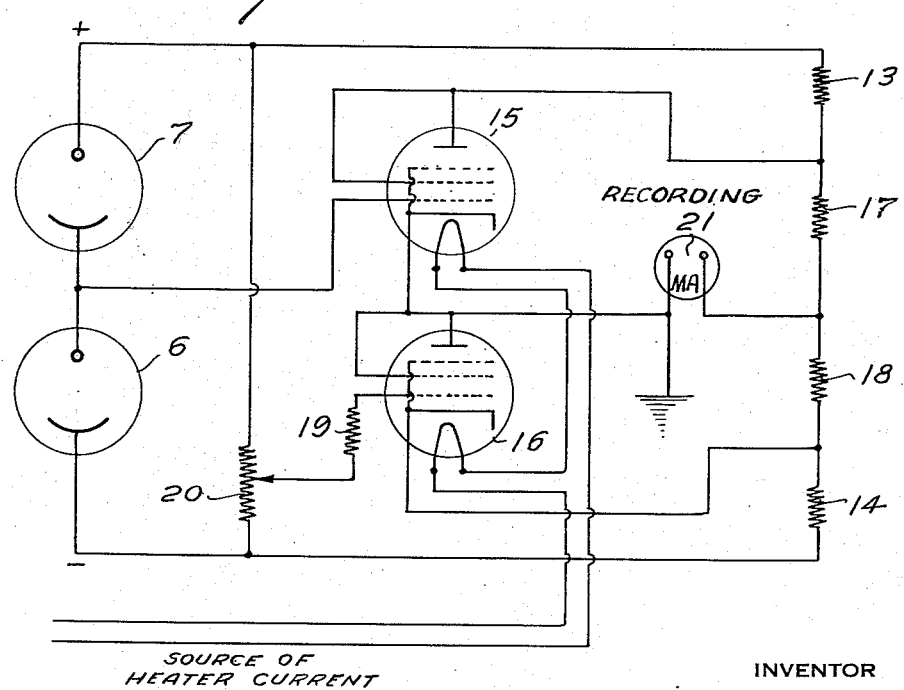
INVENTOR
EDWIN M. BAILEY, JR.,
BY
ATTORNEY June 28, 1955 E. M. BAILEY, JR 2,711,728
BLOOD PRESSURE MEASURING DEVICE
Filed Aug. 24, 1951 2 Sheets-Sheet 2
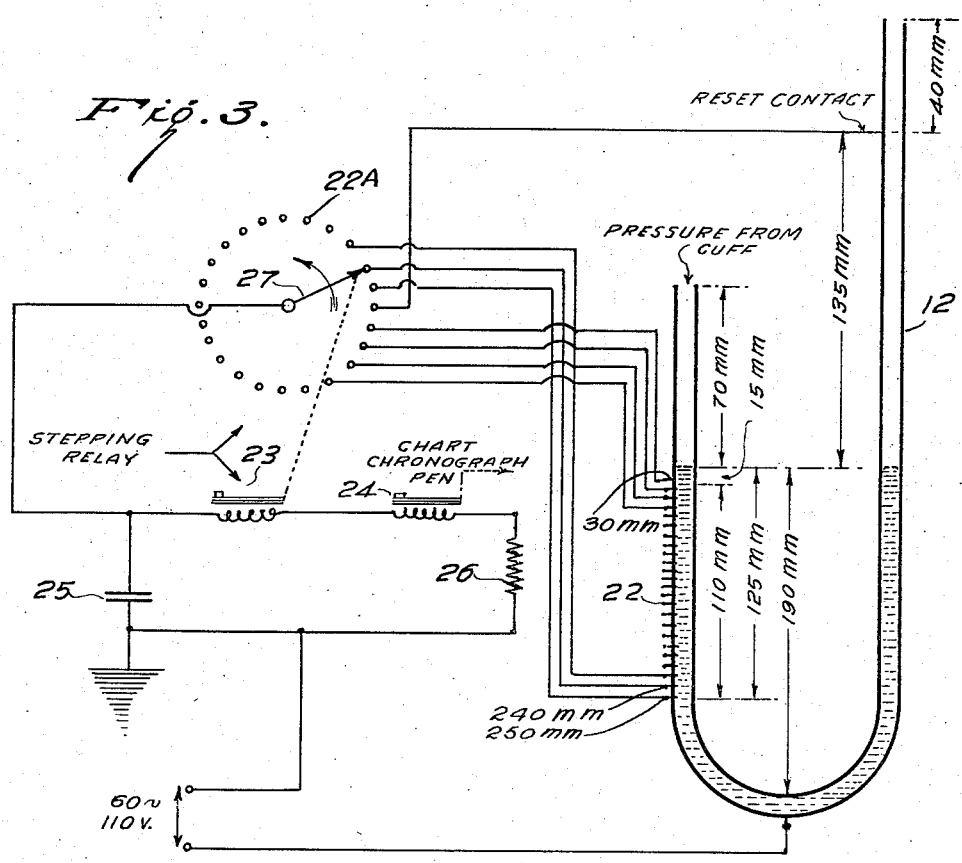
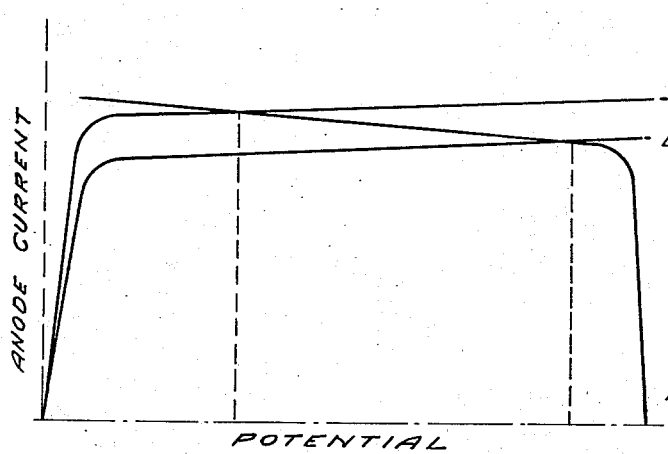
INVENTOR
EDWIN M. BAILEY, JR.
BY
ATTORNEY

United States Patent Office 2,711,728
Patented June 28, 1955

2,711,728

BLOOD PRESSURE MEASURING DEVICE

Edwin M. Bailey, Jr., Stamford, Conn., assignor to American Cyanamid Company, New York, N. Y., a corporation of Maine Application August 24, 1951, Serial No. 243,387

3 Claims. (Cl. 128—2.05)

This invention relates to a method and apparatus for measuring blood pressure and more particularly to an improved method and apparatus therefor for measuring blood pressure of small laboratory animals such as rats, by indirect means.

In blood pressure studies it is often necessary to make routine measurements on rats or other small laboratory animals. The measurement of blood pressure directly by arterial cannulation is impracticable in conscious rats. The use of anesthesia likewise is not only impracticable where measurements must be repeated daily over a period of several weeks, but also introduces changes in blood pressure which depend upon both the nature of the anesthetic and the grade of the anesthesia.

It is necessary, therefore, to resort to indirect methods of measuring blood pressure. These indirect methods depend on correlation of the resumption of blood flow in an appendage with the pressure in a pneumatic cuff applied proximally to the point at which the change in flow is observed. Circulation in the appendage is first arrested by inflating the cuff to a pressure exceeding the animal's systolic blood pressure. The cuff is gradually deflated and at a critical pressure the resumption of blood flow is observed, either visually or by means of some effect produced.

Recently there has been developed by Brosene et al., as described in U. S. Patent No. 2,540,163, an improved apparatus for the indirect measurement of blood pressure in rats and which has met with wide acceptance.

In the Brosene et al. apparatus, resumption of arterial flow in a hind foot of a rat is observed by a photoelectric densitometer as a change of optical density. The rat is placed in a restraining holder. A pneumatic cuff is wrapped around the hind leg just above the ankle, and the foot is held in place over an aperture by means of a foot holder of special design. A beam of light is passed through the foot and through the aperture to the cathode of a photoemissive tube. The load and amplifier circuits of the photocell apparatus are adjusted until an indicating microammeter is brought to balance on scale under appropriate conditions of sensitivity. When the pneumatic cuff is inflated, first the venous circulation from the foot, and then the arterial flow into it are interrupted, causing some swelling and an increase in optical density of the foot. The pressure in the pneumatic cuff is registered by a Bourdon-type gauge. As the pressure on the cuff is gradually relieved, the resumption of arterial flow is detected by a further increase in optical density brought about by swelling of the foot.

In the circuit of the Brosene et al. apparatus the vacuum tube and phototube act as mutual loads, and thus a small change in the light intensity on the phototube due to a change in optical density of the rat's foot causes a large change in the grid voltage of the amplifier tube due to the large change in the voltage division between the phototube and the vacuum tube. The resulting change in current through the microammeter causes the needle to alter its position, and thus the meter responds to changes in optical density of the rat's foot.

In using the Brosene et al. apparatus for blood pressure measurement, however, it has been found to suffer from at least two serious drawbacks. In the first place, the operator must make two observations simultaneously, one of the change in optical density of the rat's foot as indicated by the microammeter needle, and the other of the pressure in the pneumatic cuff as indicated by the Bourdon gauge. Moreover, the microammeter reading fluctuates erratically. Since the end point in the blood pressure measurement occurs when the current through the microammeter starts to decrease causing a deflection toward zero reading, the occurrence of fluctuations unrelated to the blood pressure measurement may lead to spurious results. In practice, the validity of a reading may be tested by reinflating the cuff to a pressure well above the annimal's systolic level and repeating the determination. When the cuff pressure is thus again raised, the microammeter needle stops or reverses, falling again when the pressure in the cuff once more equals or just falls below the systolic pressure of the rat. However, the operator again must decide just when the true reading is obtained. The deflection of the microammeter must be followed until it is obvious that the excursion will continue. By this time the pressure gauge will read below the true end-point.

Basically the present invention constitutes an improvement upon the Brosene et al. apparatus in that the aforementioned difficulties have been overcome principally by improving the amplifier stability and by the introduction of means for continuously recording manometric pressure and optical density of the rat's foot. This latter feature is particularly important in that it provides for greater objectivity in making blood pressure determinations, and thus the use of the present device is less dependent on the skill of the operator. Moreover, the likelihood of incorrectly recording manometric pressure and optical density is likewise obviated.

The invention will be further understood by reference to the accompanying drawings, in which Figure 1 is a diagrammatic view of the elements forming the preferred embodiment of the present invention;

Figure 2 is a circuit diagram of the improved photoelectric densitometer system used in the apparatus shown in Figure 1;

Figure 3 is a view of the manometer chronograph and associated circuits used in the apparatus of Figure 1; and Figure 4 is a diagram of the characteristic curves of the phototubes used in the circuit shown in Figure 2.

Referring to Figure 1, lamp 1 is positioned so as to direct a beam of light through filter 2, condensing lenses 3 and 4, through a portion of the test subject in holder 5 onto phototube 6. Phototube 7 is positioned so as to receive light from lamp 1 directly, the amount of light thereon being adjusted by means of shutter 8 as desired. Phototubes 6 and 7 are electrically connected to an amplifier as shown, the circuit of which will be described more in detail hereinafter. Also illustrated in Figure 1 are manometric cuff 9, bulb 10, which has a suitable valve (not shown), fixed air bleed 11 and manometer 12. Connected to manometer 12 is a stepping relay which will also be described more in detail hereinafter. Recorders are connected to both the amplifier and the stepping relay as shown.

Referring now to Figure 2, phototubes 6 and 7 are series-connected across the terminals of a high voltage supply. Voltage dropping resistors 13 and 14 are respectively connected to the plate and cathode of vacuum tubes 15 and 16 which are preferably pentodes operating with their respective screen grids connected directly to their respective plates. Preferably, resistors 13 and 14 are equal in value so that the circuit is symmetrical. Vacuum tubes 15 and 16 comprising the first two arms of the bridge are series-connected as shown. The remaining two arms of the bridge are composed of linear fixed resistors 17 and 18 which are also selected to be equal in value. Resistors 17 and 18 are in parallel with vacuum tubes 15 and 16 as shown. The control grid of vacuum tube 15 is connected to the junction of phototubes 6 and 7. As can be seen, phototubes 6 and 7 constitute a voltage divider which establishes the potential at the control grid of vacuum tube 15. The control grid of vacuum tube 16 is connected preferably through a 20 megohm resistor 19 to a 0.1 megohm potentiometer 20. As will be apparent, resistors 13, 14, 17 and 18 constitute a voltage divider for vacuum tubes 15 and 16. I prefer that resistors 13 and 14 have values of 15,000 ohms each and that resistors 17 and 18 have values of 25,000 ohms each. This arrangement provides proper amplifier sensitivity.

The first purpose of the described bridge circuit is to exclude plate current from a D. C. recording milliammeter 21. Secondly, because of the high sensitivity needed, it is necessary to cancel the output variations resulting from fluctuations of plate, heater and bias voltages which occur with changes in line potential. Such variations will occur equally in both tubes, which are selected to have nearly identical characteristics, and, therefore, the bridge output will be relatively unaffected. This circuit is stable, even when operating on a power line known to be carrying electrical interferences of a wide range of frequencies of large amplitude.

The voltage division between phototubes 6 and 7 changes when the relative amount of light on these tubes changes, but the voltage division is stabilized with respect to changes in the total light output from lamp 1. Voltage changes of the power supply, which is preferably a regulated filtered direct current supply, do not affect the output of the bridge because changes of anode, bias and heater voltage occur equally in both vacuum tubes. Changes in the grid voltage of vacuum tube 15, however, will vary the bridge output which thus drives the D. C. recording milliammeter 21.

Phototubes 6 and 7 act as mutual loads. Densitometer phototube 6 receives light from lamp 1 through a selected portion of the test subject while phototube 7, the "dummy" tube, receives light from lamp 1 directly. This arrangement provides automatic compensation for fluctuation in lamp brightness. The illumination of phototube 7 may be adjusted by means of shutter 8 as mentioned hereinbefore.

The characteristic curves of the phototubes are illustrated in Figure 4. Increasing the illumination on a phototube raises its characteristic curve. Under these conditions the tube passes more current for a given voltage across it and thereby has a lower static resistance. However, the dynamic resistance, which is the reciprocal of the slope of the anode current versus plate voltage curve, will be little changed in the horizontal, "saturated" region of the curves. The voltage division between the two phototubes depends upon the point of intersection of their characteristic curves $L_1$ and $L_2$. If the curves intersect in the region where they are more horizontal, the voltage division is extremely sensitive to changes in the ratio of illumination of the two phototubes. A small change in this ratio will move the intersection of the curves in such a way as to produce a large voltage change.

The desired high sensitivity can be achieved by adjusting the light falling on "dummy" phototube 7 until its characteristic curve is able to intersect properly the characteristic curve of densitometer phototube 6. Thus, a small change in illumination on the densitometer phototube will produce a large change in the voltage applied to the grid of amplifier tube 15.

I have found that by proper adjustment of the present device sufficient power is delivered to operate a 0–5 milliampere direct recording meter over a range of 80% of full scale. For most applications, a 0–1 milliampere direct recording meter, shunted to give appropriate sensitivity, is preferred.

Referring now to Figure 3, manometric cuff pressure is registered on J-tube manometer 12 which carries a series of electrical contacts 22, preferably spaced five millimeters apart which correspond to ten millimeters pressure intervals. Numeral 27 indicates the switch arm of a stepping relay which includes a ratchet wheel and pawls (not shown). Switch arm 27 is operated by means of the mechanical linkage indicated by the dotted line in Fig. 3 by the armature of solenoid 23 so as to rotate the switch arm 27 stepwise, in the direction of the arrow as shown, one contact point each time the solenoid is energized. The rotation of the switch arm of the stepping relay to the next contact point breaks the circuit previously established through the mercury in the manometer 12, one of the contacts 22 on the tube, and one of the contacts 22A on the stepping relay as described more in detail hereinafter. In series with solenoid 23 of the stepping relay is solenoid 24 of the recorder chronograph pen. Condenser 25 is in parallel across these series-connected solenoids to prevent arcing. Also in series with solenoids 23 and 24 is damping resistor 26 which precludes generation of interference by the stepping relay circuit which otherwise would affect the amplifier. As will be apparent from the drawing, the contact points 22A of the stepping relay and contacts 22 of the manometer are connected together electrically by suitable wiring as well as are the remaining contact points of the stepping relay and the remaining contact points of the manometer.

The use of the device of the present invention will be described particularly in conjunction with obtaining an index of the blood pressure of a small laboratory animal such as a rat, though obviously the invention is not strictly limited thereto as other animals may be used.

In carrying out the method of the present invention the rat's foot is placed in holder 5, preferably of the type shown in the Brosene et al. Patent No. 2,540,163. A very intense beam of light is projected from lamp 1 through filter 2, condensing lenses 3 and 4 and through the rat's foot onto phototube 6. The pneumatic cuff 9 is then applied to the rat's leg and is inflated by means of bulb 10 above the expected blood pressure reading, that is, the pressure is pumped up until the mercury column in manometer 12 touches the electrical contact marked "reset" in Figure 3. This allows 60 cycle 110 volt current from the power line to flow through the mercury in the manometer to the stepping relay. When the mercury column touches the electrical contact marked "reset" in Figure 3 the chronograph pen solenoid 24 is momentarily excited, but the current is promptly halted by the rotation of the switch arm of the stepping relay to the next contact position. The chronograph pen thus records a "pip" on the recording chart. As will be apparent, when the mercury column is pumped high enough to touch the reset contact, the mercury in the short arm of the manometer is too low to touch any of the contacts 22. The rotation of the switch arm of the stepping relay switch arm 27 causes it to be disconnected from the reset contact and connected to the next stepping relay contact which is connected to the manometer contact point corresponding to 250 mm. mercury pressure. The pressure in the pneumatic cuff is gradually released through small fixed air bleed 11. The mercury rises in the short arm of the manometer due to the fixed slow leak in the pneumatic line. When the mercury reaches the 250 mm. contact, the stepping relay and chronograph pen are both momentarily actuated, and the pen records a "pip" for 250 mm. pressure while the stepping relay steps to the next, or 240 mm. contact. This continues for each contact in turn until the printing of the last mark, which occurs at 30 mm.

As the cuff pressure is decreased gradually through the fixed air bleed, a pressure is reached which is equal to or just less than the systolic pressure of the rat. This permits arterial blood to enter the rat's foot, but venous blood cannot leave since the cuff pressure is still many times that necessary to collapse the veins of the leg. Consequently, rapid swelling of the foot takes place, increasing the length of the light path through the foot. This change is detected as a change in optical density of the foot, producing a rapid change in current due to sensitivity features through the recording milliammeter and hence a rather abrupt change in direction of the line traced by the pen on the recorder chart. The chronograph record is made on the same chart so that the pressure corresponding to the point at which this deviation occurs can be found by referring to the calibration marks made by the chronograph pen.

In using the instrument of the present invention, I have found that the optimum bleed rate through the fixed air bleed is to allow the pressure in the J-tube to fall from 250 mm. mercury pressure to 30 mm. mercury pressure in approximately 25 seconds. Obviously, the pressure fall should not be too rapid as the stepping relay will not function properly.

I prefer to use a restraining cage for holding the rat of the type shown in the Brosene et al. Patent No. 2,540,163, since it has been found that this type of cage keeps the rat in a comfortable position and thus helps to prevent sudden movements of the rat's foot that may cause undesirable deflections.

In practice, it has been found that this device is reliable and easy to use by unskilled operators. The chart affords a permanent record and makes it simple for the determination of the blood pressure of the test subject without having to watch and record manually the change in optical density of the selected portion of the test subject as well as the pressure in the pneumatic cuff, as is necessary in using prior art devices.

I claim:

1. An apparatus for measuring blood pressure comprising in combination a manometer having a plurality of spaced electrical contacts thereon, a stepping relay including a switch arm associated with said manometer, a plurality of electrical contacts on said stepping relay connected to said contacts on said manometer, a chronograph recorder connected to said stepping relay, a manometric cuff pneumatically connected to said manometer, a holder for a portion of a test subject, the circulation of which is affected by the pressure of said cuff, a light source, a photoelectric system responsive to light from said source, the holder being located between the light source and the photoelectric system, a vacuum tube amplifier connected to said photoelectric system for amplifying the electrical signal from said photoelectric system, a recording millimeter connected to said amplifier, and means to adjustably vary the pressure in said manometric cuff whereby changes in optical density and manometer pressure are simultaneously recorded on the same chart so that the pneumatic pressure at which the optical density changes abruptly may be determined.

2. A circuit which comprises two series-connected phototubes, one for a constant source of light and the other for a variable source of light, two series-connected vacuum tubes each having a plate, control grid, cathode and heater source wherein the plate of the first of said tubes is connected to the cathode of the second of said tubes, a plurality of at least four series-connected voltage dropping resistors wherein the junction of the first two of said resistors is connected to the cathode of the first of said vacuum tubes and the junction of the last two of said resistors is connected to the plate of the said second vacuum tube, said phototubes being connected to said resistors in series and the control grid of one of said vacuum tubes being connected to the junction of said phototubes.

3. A circuit which comprises two series-connected phototubes, one for a constant source of light and the other for a variable source of light, two series-connected vacuum tubes each having a plate, control grid, cathode and heater source wherein the plate of the first of said tubes is connected to the cathode of the second of said tubes, a plurality of at least four series-connected voltage dropping resistors wherein the junction of the first two of said resistors is connected to the cathode of the first of said vacuum tubes and the junction of the last two of said resistors is connected to the plate of the said second vacuum tube, said phototubes being connected to said resistors in series, the control grid of one of said vacuum tubes being connected to the junction of said phototubes, and the control grid of the other of said vacuum tubes being connected to a potentiometer in parallel with said phototubes.

References Cited in the file of this patent

UNITED STATES PATENTS

| | | |
|---|---|---|
| 2,123,573 | McFarlan et al. | July 12, 1938 |
| 2,173,164 | Hansell | Sept. 19, 1939 |
| 2,352,875 | Williams et al. | July 4, 1944 |
| 2,493,301 | Loria et al. | Jan. 3, 1950 |
| 2,506,384 | Rich | May 2, 1950 |
| 2,540,163 | Brosene et al. | Feb. 6, 1951 |
| 2,571,124 | Farrand | Oct. 16, 1951 |

FOREIGN PATENTS

| | | |
|---|---|---|
| 622,934 | Great Britain | May 10, 1949 |